Sept. 17, 1968     P. J. M. TAUVERON     3,401,795
FLUIDIZED BED AND ELECTROSTATIC FIELD TYPE SEPARATOR
Filed March 17, 1965     3 Sheets-Sheet 1

United States Patent Office 3,401,795  
Patented Sept. 17, 1968

3,401,795  
FLUIDIZED BED AND ELECTROSTATIC FIELD TYPE SEPARATOR  
Pierre Jean Marie Tauveron, Grenoble, Isere, France, assignor to SAMES, Societe Anonyme de Machines Electrostatiques, Paris, France, a joint-stock company of France  
Filed Mar. 17, 1965, Ser. No. 440,478  
Claims priority, application France, Mar. 27, 1964, 4,669  
19 Claims. (Cl. 209—12)

ABSTRACT OF THE DISCLOSURE

A mixture to be separated into its individual components is formed into a fluidized bed upon the perforate false bottom 2 of container 1. A grid electrode 6 connected to a high voltage source 7 charges to a common polarity only an uppermost layer of the fluidized bed, which predominantly contains a ligher fraction of the mixture. This charged lighter fraction is extracted along the lines of force 4' of an upwardly directed electric field created between electrode 6 and electrodes 8–9 (FIG. 1).

---

This invention relates to the separation of the constituents in a mixture of solids, a process that is frequently required in the treatment of mineral ores and in many other fields of industry.

Any separating process of this sort must necessarily rely on some differential property between the constiuents to be sorted out. One such property very frequently found useful is specific gravity. It has been known for many years to separate the constituents out of a mixture of solid particles on the basis of specific gravity, as by first grinding the mixture to a relatively uniform particle size and then placing it on a vibrating or jigging table. The table may be inclined to the horizontal so that the vibrational movements of the table will cause the particles of the heavier constituents to migrate downwards along the table at a faster rate than lighter particles. Instead of inclining the table, the vibratory forces applied may include an inclined component. While mechanical density separators of this kind are widely used, they have serious drawbacks. Their efficiency is not very great. They involve relatively complicated, heavy and expensive mechanism including many revolving and otherwise moving parts which require considerable maintenance, consume much power and are usually extremely noisy.

Another class of separator apparatus that has gained popularity in recent years is based on the use of electrostatic forces. In methods of this type, the particles are made to acquire selective electric charges, by friction or otherwise, and are then exposed to an electrostatic field. Provided it is possible to ensure that the particles of one constituent have acquired one type of electric charge, say positive, and the particles of another constituent have acquired the opposite, i.e. negative, charge, or no charge at all, then it is evident that the applied field can be made to produce a spatial separation between the constituents. Such electrostatic separators have considerable advantages over the mechanical type first referred to wherever they can be applied. Unfortunately they are not applicable in all cases since it is not always feasible to impart selective electric charges to the particles of the constituents that are to be separated from one another. Thus, the particles may all be conductive, in which case they will all take on similar charges through conductive contact; or the particles of all constituents may be insulating, but of such physical properties that they will again take on charges of similar polarity when it is attempted to electrify them by friction or any other means. A particularly important instance of mixture is the mixture of carbon and cryolite ($F_3Al \cdot 3FNa$) constituting the waste product of aluminum ore refining processes. Both the carbon and the cryolite constituents would be of value if separated. However, both substances are electrically conductive to degrees that are sufficiently similar to make it virtually impossible to impart differential electric charges thereto which would make them amenable to electrostatic separation by conventional methods.

It is an object of this invention to provide an improved method of separation using an electrostatic extracting field, in which the constituents to be separated from one another need not differ in their electrical properties. A more specific object is to provide an improved method of separating the cyrolite from carbon in aluminium plant waste, using an electrostatic extracting field. A further object is to provide a method of separation which will combine the desirable features of electrostatic fields with the usual broad selectivity of densimetric processes (i.e. separation based on differences in specific gravity).

In accordance with a basic aspect of the invention, the mixture to be sorted into its constituents may first be ground to contain particles relatively uniform in size if this is necessary. The mixture is then converted into a fluidized bed by conventional fluidization techniques, such as by blowing air upward into the bottom of the mass through a porous or perforate plate on which the mass is supported. All of the particles in only an uppermost section of the fluidized bed are then electrified to a common polarity. An electric field is applied to the thus charged particles to convey them out of the fluidized bed.

Because in a fluidized bed the particles tend to segregate in accordance with gravity, the average density of the particles decreases in the vertically upward direction within the bed. Hence, the uppermost section of the bed, which according to the invention is subjected to electrification, contains predominantly the more lightweight constituent of the mixture. The applied electrostatic field will therefore selectively act predominantly on said lightweight constituent to discharge it out of the bed. Experience shows that this selective process is capable of achieving, in one or more steps, an extremely effective separation.

It may be indicated at this point that fluidization techniques have been applied in the prior art to both classes of conventional separators earlier discussed herein, i.e. both to mechanical densimetric separators and to electrostatic separators. In all cases, however, the purpose of the fluidizing step was to increase the mobility of the particles in order that they should respond more effectively to the forces applied to them, i.e. the vibrational forces in mechanical separators, and the electrostatic forces in the electrostatic separators. Fuidization in conventional electrostatic separators has also served to extend the time the individual particles remained exposed to the electrostatic separating field.

Thus, the refinement of applying fluidization in conventional separators did not alter the basic character (densimetric or electrostatic) of the separating action applied to the particles. By the same token, such prior-art fluidization obviously did not impart the benefits of electrostatic extraction to the mechanical densimetric separators; nor did such prior-art fluidization make it possible to use electrostatic extraction in cases where the constituents possess similar electrical properties.

The present invention on the other hand, in that it combines the features of density separation, electrostatic techniques and fluidization techniques in a wholly novel manner, provides inter alia the unexpected result of permitting electrostatic separation of a wide range of mixtures that were believed inherently incapable of such separation owing to the intrinsic electro-physical properties of the constituents involved.

Exemplary embodiments of apparatus for carrying out the process of the invention, as well as additional details of the said process, will now be described with reference to the accompanying drawings wherein.

As will be understood from explanations given earlier herein, and as will become clearer presently, the process of the invention contrives to achieve a separation by means of an electrostatic field, on the basis not of any difference in electrical properties of the constituents, but on the basis of their difference in density or specific gravity. For this purpose the invention makes use of the segregation in accordance with density that occurs spontaneously when a mixture of different-density constituents is converted into a fluidized bed. Since in a fluidized bed the particles are thrown upwards by the jets of air (or other fluidizing gas) to a height that is greater in proportion as the particles are lighter, it is evident that the upper regions of a fluidized bed will consist predominantly of particles of the more lightweight constituent of a multiconstituent mix. By electrifying only an uppermost section of the fluidized bed, therefore, it becomes posible to perform the desired selective separation of the different-density constituents by means of an electrostatic field.

Clearly, in order that the process shall operate effectively, the particles of the different constituents in the mix should all be more or less the same size. Obviously, a very small particle of a constituent having high specific gravity may be thrown up to a greater height than a much larger particle of a low-density constituent. However, in view of the statistical nature of the separation produced, the above condition as to uniformity in size between the particles is not extremely critical. Experience shows that satisfactory results are obtained if the granulometric range of the mixture does not substantially exceed a ratio of 1:3 (that is, the ratio of the average particle size of the finest fraction present to a substantial degree in the mix, to the average particle size of the crudest fraction substantially present, should not be much greater than 1:3). Preferably, said range ratio is not substantially greater than 1:2.

Another preliminary condition which the mixture of powder constituents is to comply with (this being in common with all similar physical separation processes), is that each individual particle in the mixture should substantially consist of only one constituent. If this condition is not initially present due to the inherent nature of the mix, then it is always possible to satisfy the condition through the application of conventional grinding and screening techniques.

Figure 1:
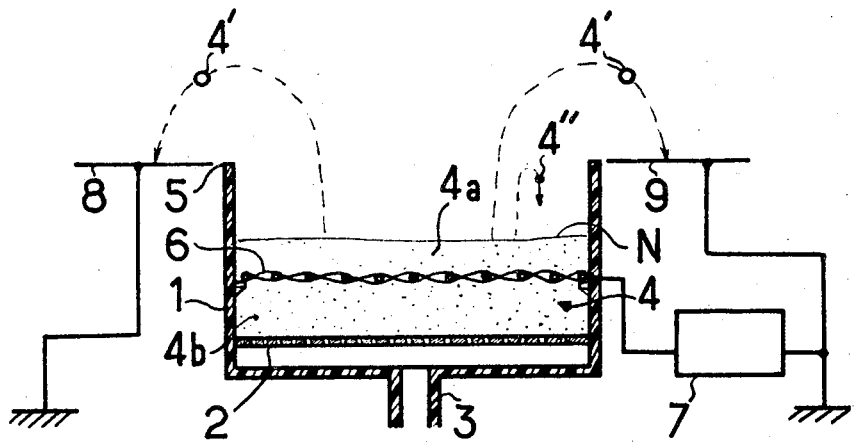
FIG. 1 is a schematic cross sectional view of one embodiment.

Referring to FIG. 1, an electrostatic density separator according to the invention is shown as comprising a fluidization tank 1 of any suitable contour, such as an elongated trough of the rectangular cross section shown. The tank is preferably made of an electrically insulating material, though this is not indispensable, for reasons later discussed. A porous or perforate plate 2 is positioned within tank 1 a short distance above its bottom. A conduit 3 opens into the bottom of tank 1 and is connected with a source of fluidizing gas, such as pressure air. The structure thus described constitutes a generally conventional fluidizing apparatus. If a body of granular or pulverulent material 4 is placed in tank 1 on the upper surface of perforate plate 2, and air under suitable pressure and flow rate is delivered through conduit 3 so as to discharge a multiplicity of small jets upwards through the perforations in the plate 2 and through the mass of material thereon, it is known that the material will assume a so-called fluidized state in which the individual particles are in constant motion about mean positions under the opposing influences of the upward impacts of the air jets and the downward force of gravity. These particle motions are comparable to the motions of the molecules in a liquid, and as a result the body of powder material assumes properties comparable to the properties of a body of liquid, in that it obeys the laws of hydrostatics that characterize liquids.

In addition to these known physical properties of a fluidized bed, which have been put to wide use in various fields of engineering, especially the chemical industry, a fluidized bed possesses a further characteristic which in most conventional applications of the fluidization techniques has been regarded as a nuisance rather than a useful property. This is that a density segregation occurs in the bed so that a decreasing density gradient is created in the upward vertical direction of the mass of fluidized particles.

The invention takes advantage of this statistical density gradient through the provision of electrifying means, here shown as a wire mesh or grid structure 6, supported from the side walls of the tank 1 a suitable distance above the perforate plate 2. The electrifying structure 6 is positioned a small distance below the upper level N reached by the lightest particles of the fluidized bed during fluidization, and is shown connected by an insulated conductor to one output terminal of a high-voltage source 7 the other terminal of which is shown grounded. A pair of horizontal electrode plates 8 and 9 are positioned close to the upper edges 5 of the side walls of the tank and extend longitudinally substantially the full length of the tank. Electrodes 8, 9 are connected to the ground terminal of high-voltage source 7.

When the bed of material 4 in the tank is fluidized by the delivery of an air stream through conduit 3 and perforate plate 2, and the high voltage (of the order of e.g. 50 kilovolts or more) is applied from source 7 to the electrifying grid 6, the fluidized particles of mixture suspended in the upper regions of bed 4 and light enough to be thrown upward by the fluidizing jet past the grid 6 become charged by repeated contact with said grid and assume a high potential corresponding to that of the source 7. These lighter particles on passing into the region above the grid 6 and entering the electrostatic field created between said grid and the electrode plates 8, 9 tend to follow the lines of force of the field and so to be discharged upward out of the tank and then drop on to the electrode plates 8, 9 which here simultaneously serve as the receiving means.

The precise vertical level at which the electrifying means such as screen 6 should be positioned within the fluidizing tank 1 for best operation depends on many factors. However, it is found that for any particular set of operating parameters, chief among which are the densities of the constituents and the average size of the particles (together determining the average particle weight of each constituent), the initial concentrations of the respective constituents in the mixture, and of course the electric voltage (and field intensity) applied, there generally exists an optimum range of vertical positions for the electrifying means 6 below the uppermost free surface N of the fluidized mass, for which best results are obtained. It will be understood that, assuming for simplicity that all the particles in the mixture are of uniform size and shape, and that all the upward streamlets of fluidizing gas act uniformly over the horizontal area of the mass, then under these simplified conditions there would theoretically exist a sharp and well-defined level in the tank above which no particles of the heavier constituent will at any time rise. Theoretically the electrifying structure should be positioned at or just above such level. In practice of course the optimum position is not as sharply defined, but still there exists a relatively narrow range of levels at which the electrifying means should be located for best results. This optimum range can easily be determined in any particular instance by trial and error.

It will be understood that the action just described is a statistical one and proceeds gradually rather than sharply. All the particles present at any time above the grid 6 are not sufficiently lightweight and sufficiently electrified to submit completely to the action of the field (as indicated for the particles 4'), but some particles will drop back into the fluidized bed as indicated for particle 4''. When such a particle is again thrown up past grid 6, it will acquire another complement of electric charge from grid 6, and on re-entering the upper region, such a particle, now fully charged, is more likely to follow the escape trajectory indicated for the particles 4', provided it is sufficiently light in weight. Thus, after this process has been allowed to go on for a sufficient period of time, the fluidized bed becomes depleted in the more lightweight constituent of the mixture and there is collected on the plates 8, 9 a product which is enriched as to its content of said lightweight constituent. Of course, the separation cannot be absolute, and a proportion of the particles of the heavier constituent will find their way on to the plates 8, 9. A major reason for this is the inevitable granulometric spread of the initial mixture whereby as explained earlier there will usually be a proportion of heavy-constituent particles in the mix that are sufficiently small in size to follow the escape path described above and reach the receiver plates 8, 9. It has been found, however, that when the granulometric spread does not exceed the earlier indicated range, 1:3 or preferably 1:2, the parameters of the system including the position of screen 6, intensity of the field gradient, and height of the walls 5, can quite easily be adjusted by preliminary testing until the system is able to achieve extremely effective separation. The process may of course, if necessary, be performed in a number of stages, with the lightweight fraction recovered on the plates 8, 9, in one stage being reprocessed in the same or another unit of the apparatus described.

Also experience has shown that it is frequently desirable to divide the separation process into two or more successive steps in which the applied electric field is incrementally increased by increasing the output voltage of source 7 applied to charging screen 6. Two such steps may for instance be used. The first step, in which a relatively low voltage field is applied, then produces a rather thorough extraction of the lightweight constituent, and when the voltage field is increased during the second step, more of the lightweight constituent is extracted, together with some of the heavier constituent. The residue in the tank can thus be made to consist almost exclusively of the heavier constituent. Such procedure is advantageous in cases where it is important to obtain the heavier constituent in a state of considerable purity.

FIGS. 2 to 5 illustrate the invention embodied as a continuous rather than a batch process. The fluidization tank 11 in the form of an elongated trough of rectangular cross section preferably made of insulating material has a perforate plate 12 extending the full length of it a short distance above the bottom of the trough. A number of pressure air delivery lines 13, 13', 13'' connected with the bottom of the tank at points spaced along its length serve to discharge fluidising air (or other gas) upwards through the perforate plate 12 to fluidize the material 14 positioned thereon. Electrifying means in the form of a horizontal screen or wire grid 16 of conductive material is supported a suitable height above perforate plate 12 from the side walls of the trough, it likewise extending the full length of the trough. Screen 16 is connected with one high voltage output terminal of source 7 having its other terminal grounded.

Figure 4:
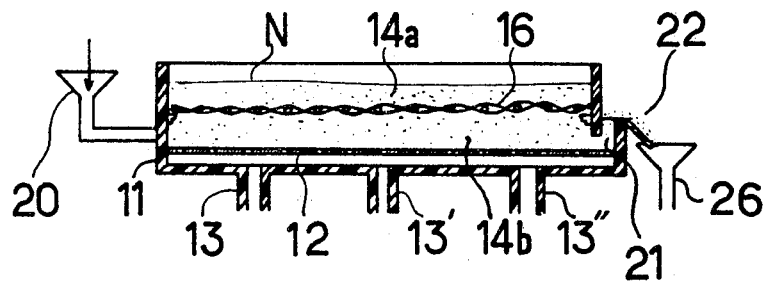
FIG. 4 is a corresponding view in longitudinal section.

One longitudinal end of trough 11 has the outlet of a feed hopper 20 connected to it just above the level of perforate plate 12 as shown in FIG. 4. The opposite end wall of the trough is formed as a syphon outlet. That is, the said end wall is divided as shown into two vertically overlapping sections which define between them an upwardly opening transverse outlet channel 21. An overflow weir 22 extends from the upper and outer edge 22 of the channel 21 and delivers into an outlet hopper or funnel 26.

Extending along the sidewalls of the fluidization trough 11 are a pair of receiver troughs 28 and 29, which have inclined inner sidewalls contiguous with the upper edges of the sidewalls of tank 11, and are made in this example of electrically insulating material. The extracting electrode means in this embodiment desirably include sets of conductive bars 30 extending in transversely spaced horizontal arrays across the uppermost levels of the receiver troughs 28 and 29, and further the vertical field electrode plates 31 extending above the receiver troughs substantially in the same vertical planes as the outer walls of these troughs. Both the bar electrodes 30 and the plate electrodes 31 are connected to the free terminal, here grounded, of the high-voltage source 7.

In the operation of the system of FIGS. 2–5, the powder mixture preliminarily screened to the approximately uniform particle size earlier indicated herein, is fed continuously into the feed hopper 20. The outlet weir 22, which is desirably adjustable in vertical elevation through conventional means not shown, is positioned at a height predetermined with respect to the input rate of material into hopper 20 and determines in turn the amount of material present in the trough 11, and hence the uppermost level N to which the fluidized bath will rise when air is admitted through pipes 13, 13', 13''. It will be understood that due to the hydrostatic, liquid-like characteristics of a fluidized bath as earlier mentioned, the bath will assume a uniform level throughout the length of the trough and the rate of outflow of material through syphon outlet 21 over weir 22 and into hopper 26, will under steady-state conditions be at all times equal to the rate of feed of material from feed hopper 20 minus the rate at which material is removed by the electrostatic field into the side collecting troughs 2, 8, 29. The free level N of the fluidized bath is adjusted to be somewhat above the charging or electrifying screen 16. In these conditions, it will be understood in the light of the explanations earlier given herein that as the material progresses longitudinally through tank 11 from the inlet end to the outlet end, the particles of the more lightweight constituent in the mix tend to be predominantly charged on rising past grid 16 and are taken up by the lines of force of the electric fields created between said grid and the vertical field electrodes 31 on each side. On rising out of the tank said particles drop under the combined actions of gravity and the attraction of bar electrodes 30 into the collector troughs 28, 29. The mixture remaining in the fluidized bed thus becomes gradually enriched in the heavier constituent, and this enriched product is continuously discharged into discharge hopper 26. The various parameters which here include the feed rate and the length of the tank 11 (as determining the effective dwell time of the particles under the separating conditions of the invention) can be so adjusted that the product discharged into hopper 26 consists almost entirely of the heavier phase of the mixture.

Figure 2:
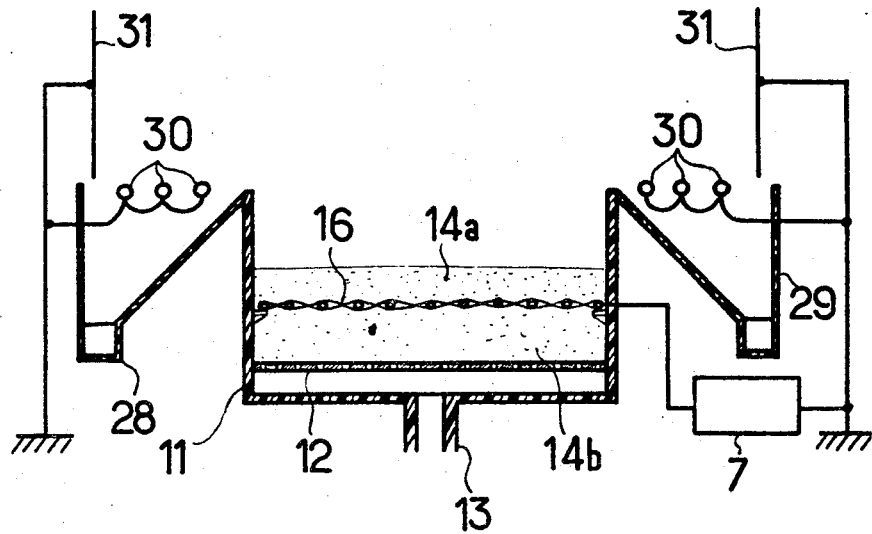
FIG. 2 is a similar view of a modified embodiment.
Figure 3:
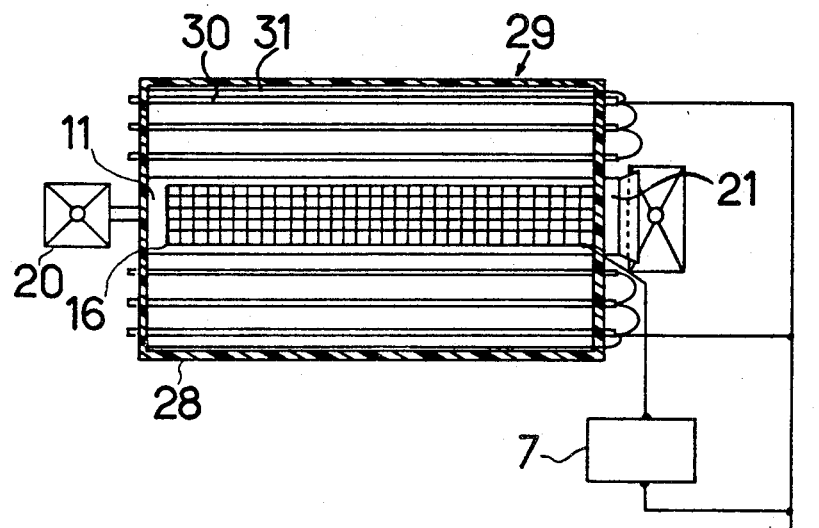
FIG. 3 is an overhead view of FIG. 2.
Figure 5:
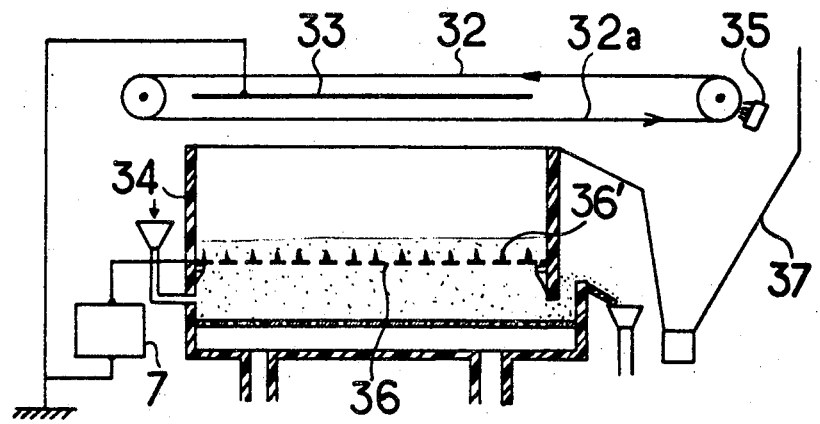
FIG. 5 is a view generally similar to FIG. 4 but illustrating a further modification.

In the modification of FIG. 5, the fluidizing tank may be generally similar to the one shown in FIGS. 2–4, but the side collecting troughs 28, 29 and the associated electrode means 30, 31 are here omitted. Instead, the low-density phase extracting means comprises an endless conveyor belt trained about end pulleys suitably supported above the fluidizing trough 34 so that the lower stretch 32a of the belt extends a short distance above the top of the trough, the belt being made of suitable high-resistance material. The extracting electrode means comprises a field plate 33 extending horizontally above the lower stretch 32a of the belt and extending the length and breadth of the trough 34. Plate 33 is connected to the grounded terminal of the high-voltage source 7, while the high-voltage terminal of the source is connected to an electrifying structure 36. While this structure 36 has been shown different from the charging screens or grids 6 and 16 shown in the first two embodiments described, as will be later discussed, it is to be understood that this is not essential and a charging structure similar to the structures shown in the other embodiments may also be used in the construction of FIG. 5.

The apparatus shown in FIG. 5 operates generally on similar lines to the apparatus of FIGS. 2–4, except that the lightweight particles charged by the electrifying structure 36 are here caused to travel upward along the vertical lines of force created between the structure 36 and the horizontal field plate 33. The upward travel of the lightweight particles is arrested by the under surface of the lower stretch 32a of the conveyor belt, and the particles cling to this surface by electrostatic attraction. These extracted particles are then conveyed with the lower stretch of the belt as far as a brushing station comprising a brush 35 supported beyond the end of trough 34 and engaging the outer surface of the belt 33 so as to brush off the particles adhering thereto. The removed particles of lightweight constituent drop into a discharge trough or hopper 37. Where the lightweight particles extracted are insulating in character (as in the case previously described) the field plate 33 can obviously be omitted, on condition that the belt 32 is made from conductive material and is itself energized to the extraction potential, i.e., the potential of the plate 33 described in the preceding example.

If desired, during the process of the invention the fluidized bed may be subjected to vibrations in order to increase the mobility of the particles and cause them to submit more freely to the actions of the forces of gravity and the electrostatic field to which they are exposed. To illustrate this possibility, a conventional vibrator is schematically shown at 48 connected to a sidewall of the fluidizing tank in FIG. 6, and it is to be understood that similar vibrating means may be applied in any other of the embodiments disclosed. While the use of vibrations may in many cases improve the efficiency and/or reduce the time required to achieve maximum separation, it is to be understood that the vibrator is merely an optional accessory and does not alter the basic character of the process.

It is also noted that plants for performing the process of the invention may in many cases advantageously be comprised of a plurality of apparatus units, of either the batch type or the continuous type here disclosed, arranged in series (or series-parallel) relation so as to process the material in a sequence of stages, using similar or different electric voltages.

As earlier indicated, the electrostatic density separators of the invention are applicable to mixtures containing particles of two (or more) constituents of unequal density, regardless of the electrical properties of the constituent particles. Thus the particles may be all conductive or they may all be insulating or the particles of one constituent may be conductive and those of the other insulating. In fact this versatility of the process of the invention constitutes one of its most attractive advantages over other types of separating methods involving the use of electrostatic fields.

However, depending on the nature of the particles it is contemplated according to the invention that different electrifying means may be used to charge them. Where the particles are conductive, the best way of electrifying them is by electric conduction from a wire mesh screen or grid (as shown in FIGS. 1–4), e.g., of copper wire. This type of electrification consumes very low current. However, if the particles are insulating they will generally only become efficiently charged by ionization rather than conduction, and it is preferred in that case to provide the electrifying structure with point electrodes, although the thin wires of a mesh will sometimes serve as sufficiently efficient ionizing electrodes. As shown in FIG. 5, a suitable electrifying structure for use with insulating or highly resistive constituent particles may comprise a screen 36 provided with a multiplicity of small sharp points 36' projecting therefrom preferably in an upward direction.

The electric charge of the particles in the uppermost layers of the fluidized bed, as applied in the method of the invention, may possibly be imparted by yet other means. It will be realized that the static electrification of solid particles is still at the present time a little-understood section of electrical science (e.g., cf. "Static Electrification" by Leonard B. Loeb, Springer-Verlag Berlin 1958, a classic in this field in the English language). The precise means used for charging the particles in a fluidized bed are therefore perforce largely empirical. While the electrifying structures disclosed in the exemplary embodiments have been tested and proved highly successful, it is contemplated that other charging or electrifying means providing equivalent results may be used in carrying out the invention.

The process of the invention will now be further illustrated by the description of two detailed examples.

*Example 1*

A mixture of carbon and cryolite ($F_3Al.3FNa$) produced as waste from aluminium ore refining plant was subjected to separation with the primary aim of recovering the valuable cryolite constituent for reuse in the aluminium refining process. The cryolite constituted 70% by weight in the mix. The cryolite had a density (specific gravity) of about 2.9 to 3, and the carbon constituent a density of 2.25. The mixture was first ground in a mill and screened to provide a powder wherein all particles were in the range from 420 microns to 840 microns. It was ascertained by sampling that substantially all of the individual particles consisted exclusively of cryolite or exclusively carbon. Five kilograms of this screened mixture were then introduced into an electrostatic density-separator apparatus of the general type disclosed above with reference to FIG. 1. The tank was made of insulating material and was 0.5 by 0.5 meters in horizontal dimensions. The fluidizing plate 2 was made of conductive material and was positioned about 0.02 meter above the bottom of the tank. The walls of the tank extended a height of 0.10 cm. above the perforate plate. The charging structure 6 was a screen of 10 mm. gauge copper wire mesh, with mesh openings of about 10 mm. by 10 mm. After preliminary tests, the screen 6 was fixed to the sidewalls of the tank at a level such that its undersurface was at an elevation of 5 cm. above the surface of fluidizing plate 2.

The 5 kilogram batch was dumped into the tank and air under pressure was injected centrally into the bottom of the tank. The powder then rose into a fluidized bed which rose to a height of about 6 cm. above the plate 2, i.e. about 1 cm. above the electrifying screen 6.

The high voltage source 7 provided by a Sames electrostatic generator was then switched on to apply a voltage of 60 kilovolts to the electrifying screen 6. Particles were then seen to rise from the upper part of the fluidized bed and to settle upon the side plates 8 and 9, which were provided in the form of flanged copper trays. After one minute's operation in these conditions, the voltage was switched off, whereupon no further powder escaped out of the bed. The powder collected from off the tray electrodes 8 and 9 was found to weigh about 1.200 kilograms and to contain about 80% carbon. The power was then again switched on, this time to supply a voltage of 80 kilovolts, and the process was allowed to continue one minute further. Another 0.980 kilogram batch was collected off the side electrodes and found to title 40% carbon.

There remained in the tank about 2.820 kilograms of a cryolite-rich powder mixture containing 97% cryolite.

Example 2

Using the same apparatus and same procedure as in Example 1, a five kilogram batch of cryolite-carbon mixture was introduced in which the initial cryolite concentration was 90%, and the granulometry range from 60 to 100 microns. A 40 kilovolt voltage was applied and there was collected after 30 seconds from the side electrode plates, 0.400 kg. of a mixture containing 70% carbon. The voltage was then increased to 50 kv. and after 30 further seconds of operation another 0.450 kg. was collected containing about 25% carbon. The tank contained 4.150 kg. of a residual cryolite rich mixture having 98% cryolite concentration.

It will be evident from the above examples that the electrostatic gravity separating apparatus of the invention gives good separation.

One reason for the heightened efficiency of the electrostatic gravity separators of the invention over conventional gravity separators of the purely mechanical vibratory type lies in the following fact. Analysising in detail the separation process of the invention, it will be realized that there are actually two separating forces at work on the particles and combining their effects. There is, first, the vertical density segregation that occurs throughout the fluidized bed due to the downward pull of gravity, the action of which is intense in proportion to the weight of the particles. Then, as the lighter particles which predominate statistically in the uper zones of the bed become charged on passing through the electrifying structure, the charged particles submit to the upwardly-acting force of the electric field, and this action is intense in proportion as the particles are light. The selective actions of gravity and the electric forces involved are thus seen to combine their effects. Considerably the larger amount of separation of course is due to the density gradient; nevertheless, the additional separation produced by the selective action of the electrostatic force upon the lighter particles acts to enhance the final separation by a quite appreciable amount, which can be roughly evaluated at the order of about 3 or 4 (additional) percent.

In practicing the invention, it is found important so to arrange matters as to avoid disturbing the gravity separation that takes place in the lower part of the fluidized bed, by the presence of undesired electrostatic fields in the deeper regions of the bed below the electrifying structure or screen. Such disturbing fields would tend to create parasitic concentration gradients between the heavy and lightweight powder constituents other than the desirable decreasing density gradient in the upper direction, as created by the force of gravity. It has been found that the avoidance of such parasitic fields as required for satisfactory working of the process can in practice be achieved in either of two principal ways. One way is to make the fluidizing tank walls (at least in their lower parts below the screen) as well as the bottom of the tank and the perforate or porous fluidizing plate out of insulating material, as has been described herein. In these conditions a state of electrical equilibrium is rapidly reached between the various surfaces with which the fluidized bed is in contact owing to exchange of electric charge between any surface regions that might initially be at different potentials, and any local voltage gradients and hence parasitic electrostatic fields that might otherwise tend to arise are quickly made to vanish.

It will thus be seen that the invention has provided a novel separating process and apparatus, which may be termed "electrostatic gravity separation," and which makes it possible to extend the well-recognized benefits of electrostatic field techniques to mixtures of substances that were previously considered incapable of electrostatic separation owing to the similarly of their electrical characteristics, and in particular constituents that are electrically conductive. While the invention was specifically developed for the purpose of cryolite recovery from aluminium plant waste products and this particular application was discussed in some detail, it will be evident that by the very nature of the process a wide variety of other applications can be envisaged. Thus, various ore mixtures, chemical constituents, plastics, and cereal grain may be processed in accordance with the invention for sorting or cleaning purpose.

It will also be apparent that the process can be applied to mixtures of more than two constituents, and can be conducted as a fractional process wherein successive constituents are separated out on the basis of increasing or decreasing density.

What is claimed is:

1. A method of separating a powder constituent out of a mixture of more than one constituent of unequal specific gravity, said mixture being in the form of particles of substantially uniform size, comprising the steps of:

blowing gas upwardly into the mixture to form it into a fluidized bed and separate the mixture into an upper layer of relatively lighter particles and a lower layer of relatively heavier particles;

imparting electric charges of like polarity to substantially all the particles contained in only an uppermost region of said bed, whereby to charge predominantly particles of a lighter one of said constituents, and creating an electric field in a direction to convey the electrically charged particles out of the fluidized bed into a receiving zone, while allowing said gas to escape freely without substantially affecting the paths along which the articles are removed.

2. The method defined in claim 1, which includes the step of increasing the intensity of said field at a determined stage during the process.

3. The method defined in claim 1, which includes vibrating the fluidized bed.

4. A method of separating a constituent out of a mixture of more than one solid constituent of unequal specific gravity, comprising the steps of:

converting the mixture into particles of substantially separate constituents of generally uniform particle size;

blowing gas upwards into the mixture to form it into a fluidized bed and separate the mixture into an upper layer of relatively lighter particles and a lower layer of relatively heavier particles;

imparting electric charges of like polarity to substantially all the particles contained in only an upper region of the fluidized bed; and creating an electrostatic field in a direction to remove the charged particles out of the fluidized bed into a receiving zone, while allowing said gas to escape freely without substantially affecting the paths along which the particles are removed.

5. The method defined in claim 4, wherein the spread of the particle sizes into which said mixture is converted covers a ratio not greater than 1:3.

6. The method defined in claim 4, wherein the spread of the particle sizes into which said mixture is converted covers a ratio not greater than 1:2.

7. A method of separating a powder constituent out of a mixture of more than one constituent of unequal specific gravity, said mixture being in the form of particles of substantially uniform size, comprising the steps of:

blowing gas upwardly into the mixture to form it into a fluidized bed and separate the mixture into an upper layer of relatively lighter particles and a lower layer of relatively heavier particles;

continuously feeding more mixture into said bed at one point thereof and continuously discharging mixture from another point of said fluidized bed into a discharging zone;

imparting electric charges of like polarity to substantially all the particles contained in only an upper region of the bed; and creating an electrostatic field in a direction to remove the charged particles upwardly from out of said fluidized bed into a receiving zone while allowing said gas to escape freely without substantially affecting the paths along which the particles are removed;

whereby to collect predominantly a lighter one of said constituents in said receiving zone and predominantly a heavier one of said constituents in said discharge zone.

8. Electrostatic density separator apparatus comprising:
a container having an open top;
fluidizing means in the base of the container including means for discharging fluidizing gas upwards through a mass of multi-constituent powder mixture placed in the container to fluidize the mass to escape through the open top of said container;
electrifying means positioned in the container at a substantial vertical elevation above said fluidizing means to charge only an uppermost region of the fluidized mass to a common electrical polarity;
electrode means energizable for creating an electrostatic field extending generally upward from said electrifying means; and
particle collecting means positioned to collect electrified particles removed from said uppermost region of the fluidized mass by said field through the open top of said container.

9. Apparatus as defined in claim 8, including a high voltage D-C generator, means connecting one output terminal of the generator to said electrifying means and means connecting another output terminal of the generator to said electrode means.

10. Apparatus as defined in claim 8, wherein the electrifying means comprises a grid-like structure of conductive material positioned in the container and connected to a high D-C voltage.

11. Apparatus as defined in claim 8, wherein the electrifying means comprises a multiplicity of ionizing electrodes connected to a high D-C voltage for charging the particles by ionization.

12. Apparatus as defined in claim 8, wherein said field-creasing electrode means and said collecting means are disposed laterally of the container.

13. Apparatus as defined in claim 8, wherein said electrode means and collecting means are disposed above and overlying the container.

14. Apparatus as defined in claim 13, wherein said collecting means includes a conveyor having a surface extending above the container and made of insulating material and the electrode means overlies the conveyor surface to attract the removed particles and cause them to adhere to said surface.

15. Apparatus as defined in claim 13, wherein said collecting means includes a conductive conveyor having a surface extending above the container and forming the electrode means.

16. Apparatus as defined in claim 13, including repeller electrode means overlying said collecting means and connected to a potential to repel the particles into said collecting means.

17. Apparatus as defined in claim 8, including vibrator means associated with the container to vibrate said fluidized mass.

18. Electrostatic density separator apparatus comprising:
a container having an open top;
fluidizing means in the base of the container including means for discharging fluidizing gas upwards through a mass of multi-constituent powder mixture placed in the container to fluidize said mass to escape from the open top of said container;
electrifying means positioned in the container at a substantial vertical elevation above said fluidizing means to electrify only an uppermost region of said fluidized mass to a common electrical polarity;
feeder means connected with one end of the container for continuously feeding the mixture thereinto;
discharge means connected with another end of the container for continuously discharging mixture therefrom;
electrode means energizable for creating an electrostatic field extending generally upward from said electrifying means; and
particle collecting means positioned to receive electrified particles removed from said upper region by said field through the open top of the container;
whereby powder particles consisting predominantly of a lighter one of said constituents will be continuously received by said collecting means and particles consisting predominantly of a heavier one of the constituents will be continuously discharged by said discharge means.

19. Apparatus as defined in claim 18, wherein said discharge means comprises a syphon outlet.

References Cited

UNITED STATES PATENTS

| | | | |
|---|---|---|---|
| 880,891 | 3/1908 | Lawson | 209—128 |
| 2,116,613 | 5/1938 | Bedford | 209—131 |
| 2,300,324 | 10/1942 | Thompson | 209—127 |
| 2,889,042 | 6/1959 | Le Baron | 209—127 |
| 2,899,055 | 8/1959 | Le Baron | 209—127 |

FOREIGN PATENTS

| | | |
|---|---|---|
| 143,744 | 4/1962 | U.S.S.R. |

FRANK W. LUTTER, *Primary Examiner.*